United States Patent
Niwa et al.

(10) Patent No.: US 6,593,449 B2
(45) Date of Patent: Jul. 15, 2003

(54) METHOD FOR PRODUCING POLYBENZIMIDAZOLE SINTERED COMPACT

(75) Inventors: Noriyuki Niwa, Tokyo (JP); Yoshisato Sasaki, Tokyo (JP)

(73) Assignee: Clariant Finance (BVI) Limited, Tortola (VG)

(*) Notice: Subject to any disclaimer, the term of this patent is extended or adjusted under 35 U.S.C. 154(b) by 9 days.

(21) Appl. No.: 10/030,412

(22) PCT Filed: Mar. 12, 2001

(86) PCT No.: PCT/JP01/01910
§ 371 (c)(1),
(2), (4) Date: Nov. 9, 2001

(87) PCT Pub. No.: WO01/66329
PCT Pub. Date: Sep. 13, 2001

(65) Prior Publication Data
US 2003/0025246 A1 Feb. 6, 2003

(30) Foreign Application Priority Data
Mar. 10, 2000 (JP) ......................................... 2000-066729

(51) Int. Cl.⁷ ............................ C08G 33/02; C08J 5/00; B29C 39/00
(52) U.S. Cl. ...................... 528/310; 264/126; 528/331; 528/342; 528/481; 528/502 C
(58) Field of Search ................. 264/109, 126; 528/310, 331, 342, 481, 502

(56) References Cited

U.S. PATENT DOCUMENTS

| 3,340,325 | A | | 9/1967 | Suffredini |
| 4,814,530 | A | | 3/1989 | Ward et al. |
| 4,861,537 | A | | 8/1989 | Ward et al. |
| 5,167,889 | A | * | 12/1992 | Alvarez et al. .............. 264/120 |
| 5,247,010 | A | | 9/1993 | Hughes et al. |
| 5,264,542 | A | * | 11/1993 | Hughes et al. .............. 528/331 |
| 5,770,142 | A | * | 6/1998 | Sasaki et al. ........... 264/331.12 |

FOREIGN PATENT DOCUMENTS

| EP | 0 705 863 | | 4/1996 |
| EP | 0 845 487 | | 6/1998 |
| EP | 0845487 A1 | * | 6/1998 |

* cited by examiner

Primary Examiner—Stephen J. Lechert, Jr.
(74) Attorney, Agent, or Firm—Alan Kass

(57) ABSTRACT

A method of producing a sintered article of polybenzimidazole by using a polybenzimidazole resin is disclosed. This method comprises the steps of: filling a mold with a polybenzimidazole resin; after closing the mold so that the polybenzimidazole resin can be densely packed in the mold, heating the mold to a predetermined temperature ranging from 500° C. to 600° C. without applying pressure to the mold from the outside; after increasing the pressure on the mold from 0 kg/cm² to 50–750 kg/cm², sintering the polybenzimidazole resin while maintaining the temperature and the pressure for 15 to 200 minutes; cooling the mold; and removing the sintered article of the polybenzimidazole resin from the mold. By this method, sintered articles of polybenzimidazole resins having no weak parts can be obtained in high yields.

31 Claims, 2 Drawing Sheets

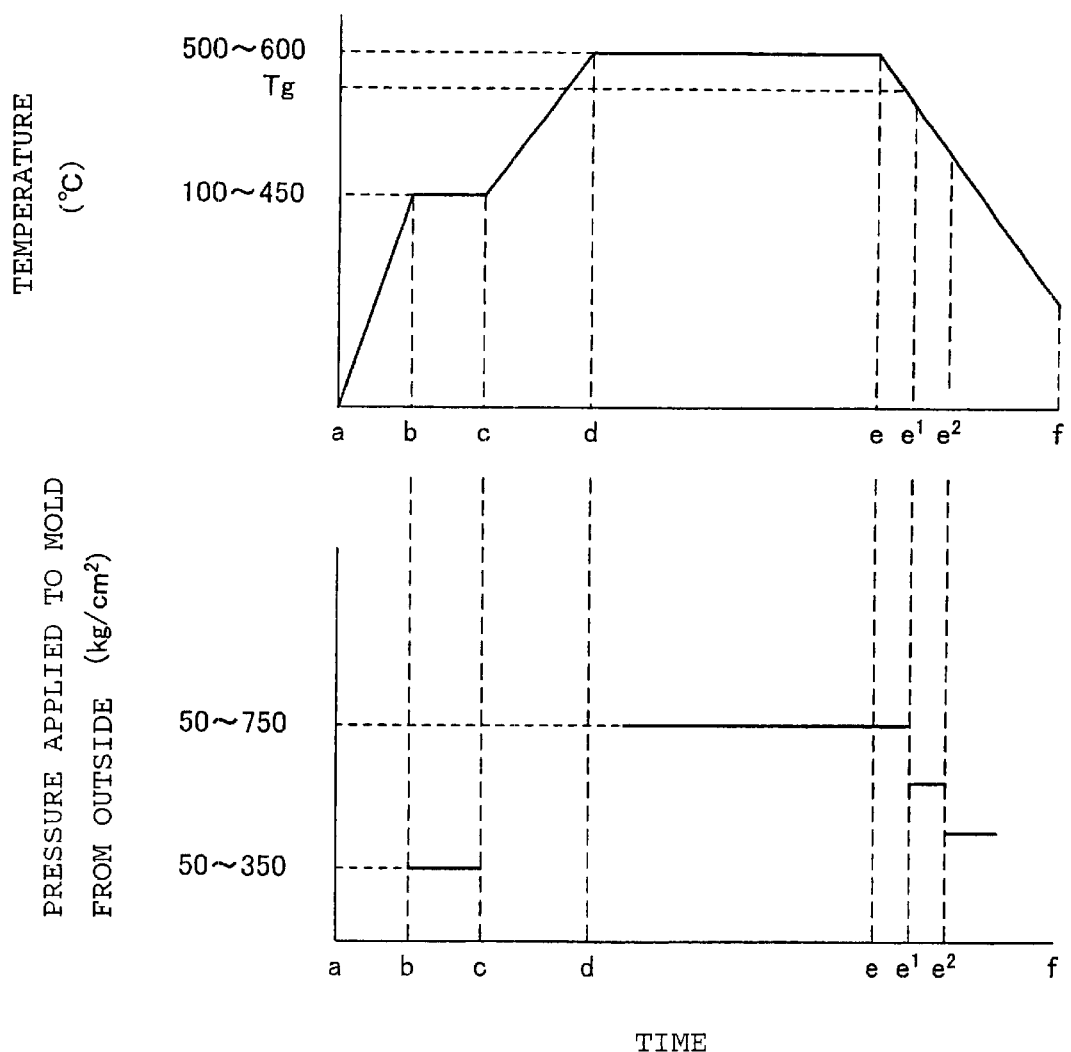
F I G. 1

METHOD FOR PRODUCING POLYBENZIMIDAZOLE SINTERED COMPACT

PRIORITY

This application claims benefit under 35 U.S.C. §371 of PCT Application No. PCT/JP01/01910, filed Mar. 12, 2001.

BACKGROUND OF THE INVENTION

1. Field of the Invention

The present invention relates to a method of producing sintered articles of polybenzimidazole resins.

2. Background Art

Polybenzimidazoles are known as polymers having wide working temperature ranges, excellent in such properties as mechanical strength, chemical resistance, solvent resistance, radiation resistance and flame retardance. A known method of producing a sintered article of polybenzimidazole by sintering polybenzimidazole is such that a mixture of a polybenzimidazole polymer and a polybenzimidazole prepolymer that serves as a sintering aid is sintered with application of sufficiently high heat and pressure (U.S. Pat. No. 3,340,325).

On the other hand, it has been found that sintered articles of polybenzimidazole resins produced by the method described in the specification of U.S. Pat. No. 4,814,530 are superior to those produced by the above-described method in physical properties, and also in the ability to give thick products. The following is a brief description of the method of U.S. Pat. No. 4,814,530.

Namely, a sintered article of polybenzimidazole can be obtained through the steps as described below. A granular polybenzimidazole resin having a particle diameter of not more than 100 meshes, a water and volatile content of not more than 0.1% by weight, and an intrinsic viscosity of at least 0.4 is placed in a mold, and pressed at a pressure of 140.6 to 1406 $kg/cm^2$ at room temperature for at least 1 minute. While maintaining the pressure in this range, the pressed polybenzimidazole resin is heated to a predetermined temperature ranging from 441° C. to 510° C. (heating step). After the temperature of the polybenzimidazole resin has reached the predetermined temperature, the pressure on the resin is released, and the resin is heated at the temperature or higher for 4 hours (sintering step). Thereafter, the sintered article of the polybenzimidazole resin obtained is pressed again at a pressure in the above-described range, and cooled to 427° C. or lower; the cooled article is then held at a temperature ranging from 441° C. to 510° C. at the pressure for at least 1 hour (post cure step), thereby finally obtaining a desired sintered article of the polybenzimidazole resin.

Japanese Laid-Open Patent Publication No. 156847/1998 proposes a method of producing a porous-part-free sintered article of polybenzimidazole, capable of minimizing the formation of voids that occurs due to gases emitted by the thermal decomposition of polybenzimidazole, and also preventing the expansion of the sintered article itself that takes place when the pressure on the mold is released (spring back phenomenon).

The above-described method is specifically as follows: while fixing the platen of a pressing machine at such a position that a polybenzimidazole resin, starting material, can be densely packed in a mold placed under the platen, that is, without applying pressure to the mold from the outside, the resin is heated to a predetermined temperature, that is, a sintering temperature; and after the temperature of the resin has reached the sintering temperature, a predetermined pressure is applied to the mold. By this method, it is possible to prevent the formation of voids in the sintered article, and also the expansion of the sintered article that is caused by the spring back phenomenon. Since the thermal conductivity of polybenzimidazole resins is low, it takes time, in this method, to elevate the temperature of the resin to the predetermined one. To compensate for this shortcoming, the polybenzimidazole resin may be sintered at higher temperatures. In this case, however, the polybenzimidazole resin can be partially oxidized, and the oxidized part of the resin can have decreased strength. Therefore, the operation under high temperatures requires great care.

To overcome the aforementioned drawbacks in the prior art, there has been demanded a method of producing, in high yields and productivity, sintered articles of polybenzimidazole resins in desired shapes, having few low-strength parts such as voids.

SUMMARY OF THE INVENTION

We found that it is possible to shorten the cycle time, and, at the same time, to maintain the product quality by preventing polybenzimidazole resins from coming into contact with oxygen while they are subjected to high temperature conditions.

Namely, a method of producing a sintered article of polybenzimidazole according to the present invention comprises, in the following order, the steps of:

(1) filling a mold with a polybenzimidazole resin, (2) after closing the mold so that the polybenzimidazole resin can be densely packed in the mold, heating the mold to a predetermined temperature ranging from 500° C. to 600° C. without applying pressure to the mold from the outside, (3) after maintaining the temperature for 0 to 100 minutes, and then increasing the pressure on the mold from 0 $kg/cm^2$ to 50–750 $kg/cm^2$, sintering the polybenzimidazole resin while maintaining the temperature and the pressure for 15 to 200 minutes, (4) cooling the mold to a temperature ranging from 50° C. to 400° C., and (5) removing the sintered article of the polybenzimidazole resin from the mold, wherein the polybenzimidazole resin is brought into contact with substantially no oxygen at least in step (2) and step (3).

According to the above-described method of the invention, it is possible to produce sintered articles of polybenzimidazole resins having quality comparable to that of sintered articles obtainable by the conventional methods, by using lower pressure conditions and shorter cycle times than those in the conventional methods.

BRIEF DESCRIPTION OF THE DRAWINGS

In the drawings,

FIG. 1 is graphs showing the relationship between time and temperature and that between time and pressure in the method of producing sintered articles of polybenzimidazole resins according to the present invention.

DETAILED DESCRIPTION OF THE INVENTION

Figure 2:
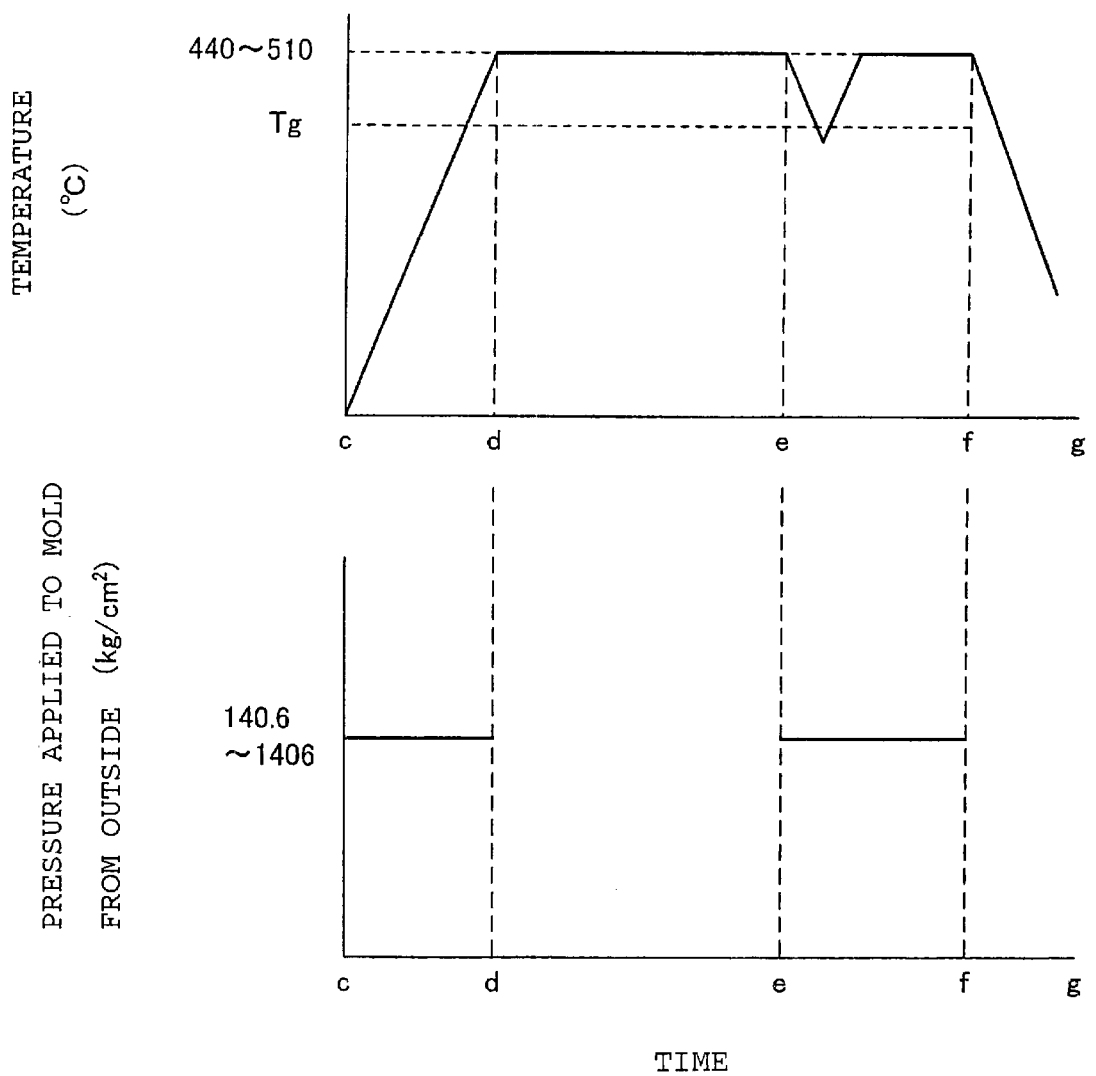
FIG. 2 is graphs showing the relationship between time and temperature and that between time and pressure in the conventional method of sintering polybenzimidazole resins (the method described in the specification of U.S. Pat. No. 4,814,530 mentioned previously).

In the present invention, any polybenzimidazole resin can be used as a starting material for producing a sintered article of a polybenzimidazole resin. In general, however, polybenzimidazole resins represented by the following general formula (I) are used:

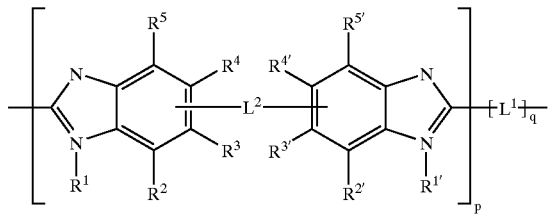

(I)

wherein $R^1$ to $R_5$ and $R^{1'}$ to $R^{5'}$ are substituents selected independently;
$L^1$ is a divalent bonding group;
$L^2$ is a divalent bonding group that connects either one of $R^1$ to $R^5$ to either one of $R^{1'}$ to $R^{5'}$; and
P and q are numbers indicating the degree of polymerization.

In the above formula, it is preferable that $R^1$ to $R^5$ and $R^{1'}$ to $R^{5'}$ be independently hydrogen, an alkyl group having 1 to 10 carbon atoms, an aryl group having 6 to 12 carbon atoms, a halogen, hydroxyl group, or an alkoxyl group having 1 to 10 carbon atoms, and that $L^1$ and $L^2$ be independently single bond, or a divalent bonding group consisting of chalcogen or an aromatic, aliphatic, alicyclic or heterocyclic compound.

In the case where $L^1$ or $L^2$ is a bonding group consisting of an aliphatic compound, it is preferably an alkylene having 1 to 8 carbon atoms, more preferably an alkylene having 4 to 8 carbon atoms. When $L^1$ or $L^2$ is a bonding group consisting of an aromatic compound, it is preferably phenylene or naphthylene. When $L^1$ or $L^2$ is a bonding group consisting of a heterocyclic compound, it is preferably pyridinylene, pyrazinylene, furanylene, quinolinylene, thiophenylene, pyranylene, indenylene or furylenylene. In the case where $L^1$ or $L^2$ is a bonding group consisting of chalcogen, it is preferably —O—, —S— or —SO$_2$—.

Specific examples of polybenzimidazoles represented by the above formula include the following polymers and copolymers:
poly-2,2'-(m-phenylene)-5,5'-dibenzimidazole,
poly-2,2'-(diphenylene-2",2"')-5,5'-dibenzimidazole,
poly-2,2'-(diphenylene-4",4"')-5,5'-dibenzimidazole,
poly-2,2'-(1",1",3"-trimethylindanylene)-3",5"-p-phenylene-5,5'-dibenzimidazole,
2,2'-(m-phenylene)-5,5'-dibenzimidazole/2,2'-(1", 1",3"-trimethylindanylene)-5",3"-(p-phenylene)-5,5'-dibenzimidazole copolymer,
2,2'-(m-phenylene)-5,5'-dibenzimidazole/2,2'-diphenylene-2",2"'-5,5'-dibenzimidazole copolymer,
poly-2,2'-(furylene-2",5")-5,5'-dibenzimidazole,
poly-2,2'-(naphthalene-1",6")-5,5'-dibenzimidazole,
poly-2,2'-(naphthalene-2",6")-5,5'-dibenzimidazole,
poly-2,2'-amylene-5,5'-dibenzimidazole,
poly-2,2'-octamethylene-5,5'-dibenzimidazole,
poly-2,2'-(m-phenylene)-diimidazobenzene,
poly-2,2'-cyclohexenyl-5,5'-dibenzimidazole,
poly-2,2'-(m-phenylene)-5,5'-di(benzimidazole)ether,
poly-2,2'-(m-phenylene)-5,5'-di(benzimidazole)-sulfide,
poly-2,2'-(m-phenylene)-5,5'-di(benzimidazole)-sulfone,
poly-2,2'-(m-phenylene)-5,5'-di(benzimidazole)-methane,
poly-2,2'-(m-phenylene)-5,5'-di(benzimidazole)-propane-2,2, and
poly-ethylene-1,2,2,2"-(m-phenylene)-5,5"-di(benzimidazole)ethylene-1,2, provided that the double bond of the ethylene group remains as it is even in the final polymer.

Of the above enumerated polybenzimidazole resins, the most preferable one is poly-2,2'-(m-phenylene)-5,5'-dibenzimidazole. Further, it is preferable to use, as starting materials in the method of the present invention, those polybenzimidazole resins having the following characteristic values:
(1) an intrinsic viscosity (IV) at 25° C. of 0.4 dl/g or more;
(2) a particle diameter, as determined by a laser-scattering particle size distribution meter manufactured by Horiba, Ltd., Japan, of 500 μm or less, preferably 150 μm or less; and
(3) a content of water and volatiles of not more than 0.1% by weight of the total weight of the resin.

If the particle diameter of a polybenzimidazole resin to be used as a starting material is small, the volume of voids originally contained in the resin particles is small. From this viewpoint, it is preferable that the particle diameter of a polybenzimidazole resin for use in the invention be in the above-described range. Further, a polybenzimidazole resin that is solid at normal temperature is hygroscopic, so that it commonly contains approximately 2% to 3% by weight of water. When a polybenzimidazole resin containing such water or volatiles is sintered, voids are inevitably formed in the sintered article. It is therefore preferable to dry the resin in advance so that the content of water and volatiles in the resin will fall in the above-described range. For instance, the content of water and volatiles in a polybenzimidazole resin may be decreased by drying the resin at 150° C. for 12 hours or more, or at 177° C. for 4 hours or more. The volatiles herein mean phenol and the like produced by the partial decomposition of a polybenzimidazole resin caused in the course of the synthesis of the resin, and remaining in the resin even after the synthesis.

The above-described drying of a polybenzimidazole resin, starting material, may be conducted separately from the process of producing a sintered article of polybenzimidazole, which will be described later in detail. However, it is also possible to simultaneously effect this drying step and the step of preheating the resin, and this manner is preferable from the viewpoint of energy efficiency. Namely, it is preferable to dry a polybenzimidazole resin, starting material, by heating just before step (1) mentioned below, thereby drying and, at the same time, preheating the resin (resin-preheating step). In this step, the heating is conducted at a temperature of 100 to 450° C., preferably 300 to 450° C. for 1 to 24 hours, preferably 1 to 10 hours. After the above-described preheating has been completed, it is preferable to immediately subject the polybenzimidazole resin to the subsequent filling step (1). Moreover, the following manner is also available: after filling a mold with a polybenzimidazole resin, the resin and the mold are preheated at the same time under the above-described conditions to dry the resin. In this case, the temperature to which the resin and the mold are heated and the heating time are also the same as those in the above-described preheating conditions.

As mentioned above, the method of producing sintered articles according to the present invention comprises the steps of heating, sintering and cooling. In addition to these steps, the method of the invention may further comprise, if necessary, the step of preheating a mold to be used. The reason for this is as follows: if the mold is preheated generally to a temperature of 100 to 450° C., preferably to a temperature of 300 to 450° C. before or after filling the mold with a polybenzimidazole resin, it is possible to rapidly transfer heat to the resin, and thus to shorten the processing time required for the whole process of producing a sintered article of the polybenzimidazole resin. For example, this preheating can be carried out by placing the mold in a forced-air circulation oven, or by means of a heater or the like built in the mold.

In the method of the present invention, a mold is firstly filled with a polybenzimidazole resin (step (1): filling step), where it is preferable that the resin has been dried in advance. Before this step, it is preferable to preheat the mold to a temperature ranging from 100° C. to 450° C. (preheating step) in order to attain quick heating to shorten the production cycle. It is preferable to effect the above-described filling step (1) subsequently to this preheating step. If the polybenzimidazole resin has not been preheated, it is heated in this filling step. In this case, therefore, the filling step and the resin-preheating step are to be effected in parallel. Further, it is desirable to ram, by pressing, the polybenzimidazole resin contained in the mold before effecting the heating step, thereby expelling the air present in the resin particles to the outside of the system. For this purpose, a pressure ranging from 50 to 350 kg/cm$^2$ is generally applied to the resin. The time required for the application of this pressure varies depending upon the size, shape, etc. of a sintered article of the resin to be finally obtained, and, it is generally 30 minutes or less Moreover, before conducting this pressing, graphite, glass, glass fiber, carbon fiber, or any other filler containing substantially no volatiles, selected depending on the desired properties may be incorporated into the polybenzimidazole resin. The platen of a pressing machine is then firmly fixed at such a position that the polybenzimidazole resin can be densely packed in the mold placed under the platen. In the case where pressure has been applied to the resin for ramming, the pressure is released to 0 kg/cm$^2$.

After the filling step, the mold is heated to a temperature at which the subsequent sintering step is effected (step (2): heating step). Throughout this heating step, no pressure should be applied to the mold from the outside. Namely, the platen of the pressing machine is remained fixed at the above-described position. Under such a condition, the pressure applied by the pressing machine to the mold placed under the platen is equal to 0 kg/cm$^2$. The mold is heated to a predetermined temperature ranging from 500° C. to 600° C. In this step, the initial temperature of the mold is 100 to 450° C. when the mold has been preheated, and room temperature, when the mold has not been preheated. In this step of heating, no pressure is applied to the polybenzimidazole resin by the pressing machine. Therefore, even if gases are emitted due to the decomposition of the polybenzimidazole resin, they can easily pass through spaces in the mold, and flee to the outside of the system. It is thus possible to decrease the volume of voids that will remain in the resulting sintered article of the polybenzimidazole resin. The heating step is effected by a heater built in the mold, or by any other heating means capable of heating the resin to the above-described extent. It is favorable to use a mold coupled with a pressing machine when the subsequent sintering step is taken into consideration. It is preferable to effect the heating step over a period of 90 to 150 minutes.

After the above-described step of heating, sintering is conducted by applying a predetermined pressure to the mold that has been heated to the sintering temperature, while maintaining the temperature (step (3): sintering step). Specifically, a predetermined pressure ranging from 50 kg/cm$^2$ to 750 kg/cm$^2$, preferably ranging from 200 kg/cm$^2$ to 450 kg/cm$^2$, which is needed to conduct sintering, is applied to the mold while holding the mold at the above-described temperature ranging from 500° C. to 600° C. It is desirable to keep, as much as possible, these pressure and temperature at the predetermined ones in the above-described ranges. For this purpose, there may be used an apparatus capable of restoring the pressure and the temperature to the predetermined ones by means of a thermostat or the like when the pressure and the temperature deviate from the acceptable ranges. The sintering time may be properly determined depending on the size, thickness, shape, etc. of a sintered article to be obtained. In general, however, it is from 15 to 200 minutes, preferably from 30 to 100 minutes. By the time the sintering step is effected, the gases emitted in the heating step by the decomposition of the polybenzimidazole resin have been mostly expelled to the outside of the system. It is therefore possible, in the sintering step, to thoroughly apply pressure to the polybenzimidazole resin. The contact area between the polybenzimidazole resin particles is thus increased; this makes it possible to obtain a sintered article having high strength.

It is noted that the following manner may also be employed: after the mold has been heated to the predetermined temperature in the heating step, and before effecting the sintering step, the mold is held at the temperature for a certain period of time without application of pressure. By doing so, it is possible to prevent gases emitted in the heating step from being expelled insufficiently and from remaining in the resulting sintered article. In this case, the heat retaining time is generally from 0 to 100 minutes.

Finally, the sintered article of the polybenzimidazole resin obtained from the above-described sintering step is cooled (step (4): cooling step), and then removed from the mold (step (5): removing step). In the present invention, it is desirable not to quickly release the pressure on the mold immediately after the completion of sintering. In the case where the sintering temperature is higher than the glass transition temperature (Tg) of the polybenzimidazole resin, it is desirable to gradually release the pressure after the sintered article has been cooled to a temperature lower than the Tg of the polybenzimidazole resin. The reason for this is as follows: if the pressure on the mold is released while the temperature of the sintered article of the polybenzimidazole resin is still higher than the Tg of the resin, the sintered article causes spring back and expands, so that it becomes difficult to finally obtain a sintered article in a desired shape. Therefore, in the case where the sintering temperature is higher than the glass transition temperature (Tg) of the polybenzimidazole resin, it is desirable, in the cooling step, to maintain the pressure that has been applied to the mold in the sintering step until the temperature of the sintered article is lowered to the glass transition temperature of the polybenzimidazole resin. For example, when poly-2,2'-(m-phenylene)-5,5'-dibenzimidazole is used as the starting material, the pressure at which the sintering step has been effected can be released only after the temperature of the sintered article of the polybenzimidazole resin has become lower than 427° C., that is, lower than the glass transition temperature of the polybenzimidazole resin. The temperature to which the sintered article is cooled and the pressure that can be applied to the sintered article at this temperature can be obtained by referring to the relationship between the compression strength (kg/cm$^2$) of the sintered article of the polybenzimidazole resin and temperature. From this relationship, the compression strength of the sintered article corresponding to the temperature of the sintered article is obtained. It is necessary to control the pressure to be applied to the sintered article so that it will be equal to or lower than the compression strength at the temperature. In particular, when the temperature of the sintered article of the polybenzimidazole resin is slightly lower than the Tg of the resin, the strength of the sintered article is not so high. Therefore, if a pressure higher than the strength is applied to the sintered article, the sintered article is broken. It is thus essential to control the pressure so that the sintered article will not be broken. Further, in the case where the sintering temperature is set to a temperature in a range lower than the Tg of the polybenzimidazole resin, spring back occurs although it is not so remarkable as that occurs when the sintering temperature is higher than the Tg. It is therefore desirable, in this case, to cool the sintered article while applying thereto a proper pressure. After the sintered article has been cooled to a temperature of 300° C. or less, for instance, it is removed from the mold. The time needed for the cooling step varies depending on the size, thickness, shape, etc. of the sintered article. In general, however, it is from 2 to 6 hours.

In the method of the present invention, it is essential that the polybenzimidazole resin be brought into contact with substantially no oxygen in step (2) and step (3). In these steps, the polybenzimidazole resin is subjected to the temperature conditions severest in the whole process. However, if the polybenzimidazole resin is not brought into contact with oxygen in these steps, it is possible to prevent the resin from undergoing oxidation, and the resulting sintered article thus shows sufficiently high strength.

Also in the steps before and after steps (2) and (3), it is preferable to avoid the contact between the polybenzimidazole resin and oxygen. Most preferably, the polybenzimidazole resin is not brought into contact with oxygen from the beginning of the resin-preheating step to the end of the removing step (step (5)).

In order to avoid the contact between the polybenzimidazole resin and oxygen, the necessary operations are conducted in an atmosphere of an inert gas, or under vacuum, or under any other condition. Of these conditions, to treat the polybenzimidazole resin in an atmosphere of an inert gas is favorable because this manner has only a few limitations on manufacturing process. More specifically, the means as described below can be employed to avoid the contact between the polybenzimidazole resin and oxygen in the respective steps.

In the resin-preheating step, the polybenzimidazole resin is preheated in an atmosphere of an inert gas.

In the filling step (step (1)), the mold is enclosed, and an inert gas is allowed to flow in the enclosure when the mold is filled with the polybenzimidazole resin. At this time, it is favorable to use an inert gas having specific gravity higher than that of air, such as argon, because such an inert gas easily accumulates within the mold and its enclosure. A sufficient amount of an inert gas should be introduced into the inside of the enclosure in order to create such a condition that the inside of the enclosure is constantly filled with the inert gas. Further, it is necessary to thoroughly purge oxygen even after the completion of filling.

In the heating step (step (2)), the mold is heated within the enclosure as in the filling step. In the case where the filling step and the subsequent heating step are effected within the enclosure, the inert gas that is introduced to the filling step may be successively introduced to the heating step. The mold may also be heated in a heating oven in an atmosphere of an inert gas.

In the sintering step (step (3)), the pressure of the pressing machine itself is supplied to the polybenzimidazole resin placed in the mold. This is equivalent to such a condition that the resin is substantially "covered with a lid", and does not come in contact with oxygen. It is however more preferable that the mold and the pressing machine be placed in an atmosphere of an inert gas.

In the cooling step (step (4)), the sintered article of the polybenzimidazole resin is cooled while maintaining the atmosphere in which the polybenzimidazole resin has been sintered. The contact between the sintered article and oxygen can thus be avoided.

By the time the removing step (step (5)) is effected, the sintered article of the polybenzimidazole resin has usually been cooled to a temperature at which the polybenzimidazole resin never undergoes oxidization, so that it is not necessary to effect the removing step in an atmosphere of an inert gas. However, if the sintered article is removed from the mold at a relatively high temperature in order to shorten the cycle time, it is preferable that the removing step be also effected in an atmosphere of an inert gas.

Examples of inert gases useful herein include nitrogen gas, argon gas, neon gas, and other gases that cause substantially no reaction with polybenzimidazoles.

To explain the present invention in more detail, the relationship between time and temperature and that between time and pressure in the method of the invention are shown in FIG. 1. This figure plots time as the abscissa; the upper graph plots temperature as the ordinate, and the lower graph, pressure.

Time a–b corresponds to the step of preheating a mold to 100 to 450° C. This preheating step is optionally effected in order to shorten the process cycle, as needed.

Time b–c corresponds to the step of filling the mold with a polybenzimidazole resin that has been preheated, as needed, and ramming the resin. In general, a pressure of about 50 to 350 kg/cm$^2$ is applied to the resin for ramming. In the case where the mold has been preheated to a predetermined temperature in the previous step, it is preferable, in this step, to hold the mold at the temperature.

Time c–d corresponds to the step of heating the mold to a sintering temperature before effecting the sintering step. In this step, it is essential that the platen of the pressing machine be fixed at the position at which the polybenzimidazole resin has been rammed in time b–c and that no pressure be applied to the mold from the outside. The pressure applied to the mold by the pressing machine under such a condition is equal to 0 kg/cm$^2$. The setting of temperature is changed to a predetermined temperature ranging from 500° C. to 600° C. from room temperature when the mold has not been preheated in the previous step, or from the temperature to which the mold has been preheated. In general, the time needed for the heating step is from 90 to 150 minutes.

Time d–e corresponds to the sintering step that is effected by applying a predetermined pressure to the mold after the mold has been heated to the sintering temperature in the previous heating step. The application of pressure is started 0 to 100 minutes after the completion of the heating step, preferably after the gases emitted by the decomposition of the polybenzimidazole resin have been mostly expelled from the resin, for example, 5 to 60 minutes after the completion of the heating step. The time needed for the sintering step including the step of expelling the gases emitted from the resin and the step of applying pressure to the mold is from 15 to 200 minutes.

Time e–f corresponds to the step of cooling the sintered article of the polybenzimidazole resin after the completion of sintering. In the case where the preset temperature in the sintering step is equal to or higher than the Tg of the polybenzimidazole resin, the sintered article of the polybenzimidazole resin causes spring back when the pressure on the mold is released while the temperature of the sintered article is still equal to or higher than the Tg, so that it is difficult to finally obtain a sintered article in a desired shape. For this reason, it is desirable to reduce the pressure after cooling the sintered article to a temperature corresponding to $e_1$ (after the temperature of the sintered article has become lower than the Tg of the polybenzimidazole resin). Further, the pressure may also be reduced in two or more steps when the sintered article has a complicated structure, or depending on the process conditions. One specific example is as follows: in the case where poly-2,2'-(m-phenylene)-5,5'-dibenzimidazole is used as the starting material, the pressure is reduced to some extent after the sintered article has been cooled to a temperature lower than 427° C., that is, lower than the glass transition temperature of the polybenzimidazole ($e_1$); and the pressure is further reduced to a required pressure after the temperature of the sintered article has further been lowered ($e_2$).

In the present invention, it is essential that the polybenzimidazole resin be not brought into contact with oxygen during the period of time c–e. It is clear from FIG. 1 that since the temperature of the sintered article of the polybenzimidazole resin right after the completion of the sintering step is still high, the resin tends to undergo oxidation. It is therefore preferable that the sintered article be not brought into contact with oxygen even after the completion of the sintering step until the sintered article is cooled sufficiently.

The relationship between time and temperature and that between time and pressure in the method of sintering polybenzimidazoles described in the specification of the previously-mentioned U.S. Pat. No. 4,814,530 is shown in FIG. 2 for reference. This figure plots time as the abscissa; the upper graph plots temperature as the ordinate, and the lower graph, pressure to be applied to a mold from the outside. In this method, water and volatiles are firstly removed from a polybenzimidazole resin in order to prevent the formation of voids. This resin is then placed in a mold, and pressed (compacted) with application of pressure (time c). Time c–d corresponds to the step of heating the polybenzimidazole resin to a sintering temperature before effecting the step of sintering the resin. In this heating step, the polybenzimidazole resin is heated to a predetermined temperature ranging from 440° C. to 510° C. while successively applying pressure to the mold. The time needed for the heating step is from 90 to 150 minutes. Time d–e corresponds to the step of sintering the resin that has been heated to the sintering temperature in the previous step, while maintaining the temperature after releasing the pressure on the mold. Time e–f corresponds to the post cure step in which the sintered article of the polybenzimidazole resin is once cooled to a temperature lower than the Tg of the polybenzimidazole resin while applying, to the sintered article, a pressure in the same range as in the heating step in order to prevent the expansion of the sintered article, and then heated, while maintaining the pressure, to a temperature in the same range as in the sintering step. After time f, the pressure is released, and the sintered article of the polybenzimidazole resin is cooled and then removed from the mold.

The method of the present invention is different from the above-described conventional method of producing sintered articles in that it has a period of time in which no pressure is applied to the mold. In this period of time, gases emitted by the thermal decomposition of the polybenzimidazole resin can flee from the mold. Therefore, voids scarcely remain in the resulting sintered article. Cracking due to such voids thus hardly occurs in the resin, resulting in decrease in the fraction defective of the final product.

Furthermore, in the method of the present invention, pressure is applied to the mold in the sintering step, so that there can be prevented the expansion of the sintered article of the polybenzimidazole resin due to spring back or gases emitted by the decomposition of the polybenzimidazole resin. A sintered article in a desired shape can thus be obtained successfully.

Examples of gases that are emitted from polybenzimidazole upon heating include non-polymeric substances that are the decomposition products of a polybenzimidazole resin itself, and gases that are emitted by reaction caused at high temperatures between a polybenzimidazole resin and lithium chloride (LiCl) that has been added to the polybenzimidazole resin as a stabilizing agent. Specific examples of such gases include CO, $CO_2$, $CH_4$, chloroform and phenol. This composition of gases is confirmed by subjecting, to gas chromatography/mass spectrometry, gases emitted from a polybenzimidazole resin when the resin is heated to approximately 500° C.

The sintered articles of polybenzimidazole resins obtained by the method of the present invention are highly resistant to ketone, organic acids, oil well brine water, oil well sour gases, aromatic hydrocarbons, aliphatic hydrocarbons and halogenated hydrocarbons. They are therefore particularly suitable for uses to which other resins are not applicable or in which durability is highly required, for example, for the production of those items that are used at extremely high temperatures or in severe chemical environments. In particular, they are favorably used for gaskets for use in the petroleum industry, seals, O-rings, bearings, parts for use in the production of semiconductors, heat insulating rings, gears, ball bearings, parts for use in the production of glasses, valves, and other items for use in the field of terrestrial heat and in the petrochemical and other industries.

EXAMPLES

Example

A polybenzimidazole resin powder was placed in a drying oven, and held at 400° C. for 6 hours in an atmosphere of nitrogen. A mold having dimensions of 200 mm (length)×200 mm (width)×25 mm (height) was selected. Before filling the mold with the polybenzimidazole resin powder, the mold was preheated to 400° C. by a heater built in the mold. The preheated mold was enclosed, and Ar gas was introduced into the inside of the enclosure so that the mold would be entirely present in an atmosphere of Ar gas.

Next, the resin powder that had been dried at 400° C. was taken out from the drying oven, and the mold was immediately filled with this resin powder. An upper punch was then placed on the mold to avoid the direct contact between the resin powder and air, and the resin powder was heated to 530° C. A pressure of 300 kg/cm$^2$ was applied to the mold by pressing when 15 minutes passed after the temperature of the resin powder had reached 530° C. While maintaining the pressure, the resin powder was heated at the temperature for 50 minutes. Thereafter, the lowering of the temperature of the resin powder was started; when the temperature of the resin powder reached 350° C., the pressure on the mold was reduced to 190 kg/cm$^2$, and when it reached 300° C., the pressure was completely released.

In a series of the steps described above, that is, from the step of filling the mold with the resin powder to the step of cooling the sintered article to 400° C., a sufficient amount of Ar gas was allowed to flow constantly so that the mold would always be surrounded by Ar gas.

The sintered article of the polybenzimidazole resin removed from the mold was found to be an excellent molded product having a tensile strength of 1,600 kg/cm$^2$. The tensile strength at a high temperature of 350° C. of this sintered article was also as high as 11 kg/cm$^2$.

Comparative Example

The polybenzimidazole resin was sintered under the same conditions as in the above Example except that the steps of heating, sintering and cooling to 400° C. were effected in the air.

The sintered article of the polybenzimidazole resin obtained was found to have cracks on its surface. The tensile strength of this sintered article was 850 kg/cm$^2$.

What is claimed is:

1. A method of producing a sintered article of polybenzimidazole comprising, in the following order, the steps of:
   (1) filling a mold with a polybenzimidazole resin,
   (2) after closing the mold so that the polybenzimidazole resin can be densely packed in the mold, heating the mold to a predetermined temperature ranging from 500° C. to 600° C. without applying pressure to the mold from the outside,
   (3) after maintaining the temperature for 0 to 100 minutes, and then increasing the pressure on the mold from 0 kg/cm$^2$ to 50–750 kg/cm$^2$, sintering the polybenzimidazole resin while maintaining the temperature and the pressure for 15 to 200 minutes,
   (4) cooling the mold to a temperature ranging from 50° C. to 400° C., and
   (5) removing the sintered article of the polybenzimidazole resin from the mold, wherein the polybenzimidazole resin is brought into contact with substantially no oxygen at least in step (2) and step (3).

2. A method according to claim 1, further comprising, before step (1), the step of preheating the polybenzimidazole resin.

3. A method according to claim 2, wherein the polybenzimidazole resin is preheated to a temperature ranging from 100° C. to 450° C. for 1 to 24 hours.

4. A method according to claim 2, wherein the polybenzimidazole resin is brought into contact with substantially no oxygen from the beginning of the resin-preheating step to the end of step (5).

5. A method according to claim 4 wherein the polybenzimidazole resin is brought into contact with substantially no oxygen from the beginning of the resin-preheating step to the end of step (5) by conducting from the beginning of the resin-preheating step to the end of step (5) in an inert gas atmosphere.

6. A method according to claim 5 wherein the inert gas is selected from nitrogen gas, argon gas, and neon gas.

7. A method according to claim 6 wherein the inert gas is argon gas.

8. A method according to claim 1, wherein the polybenzimidazole resin is brought into contact with substantially no oxygen from the beginning of step (1) to the end of step (5).

9. A method according to claim 8 wherein the polybenzimidazole resin is brought into contact with substantially no oxygen from the beginning of step (1) to the end of step (5) by conducting from the beginning of step (1) to the end of step (5) in an inert gas atmosphere.

10. A method according to claim 9 wherein the inert gas is selected from nitrogen gas, argon gas, and neon gas.

11. A method according to claim 10 wherein the inert gas is argon gas.

12. A method according to claim 1, further comprising, before step (1), the step of preheating the mold to a temperature ranging from 100° C. to 450° C.

13. A method according to claim 1, further comprising, between step (1) and step (2), the step of heating the mold and the polybenzimidazole resin contained in the mold at a temperature ranging from 100° C. to 450° C. for 1 to 24 hours.

14. A method according to claim 1, further comprising, before step (2), the step of ramming the polybenzimidazole resin at a pressure of 50–350 kg/cm$^2$ for 30 minutes or less.

15. A method according to claim 1, wherein the temperature of the polybenzimidazole resin maintained in the sintering step (step (3)) is equal to or higher than the glass transition temperature of the resin; and, in step (4), the pressure applied to the mold in the sintering step is maintained until the temperature of the sintered article of the polybenzimidazole resin becomes lower than the glass transition temperature of the resin, and then reduced to 0 kg/cm$^2$.

16. A method according to claim 1, wherein the temperature of the polybenzimidazole resin maintained in the sintering step (step (3)) is lower than the glass transition temperature of the resin; and, in step (4), the pressure applied to the mold in the sintering step is reduced in two or more steps by 50 to 300 kg/cm$^2$ per step at intervals of from 5 to 60 minutes.

17. A method according to claim 1, wherein the length of time in which the temperature and the pressure are maintained at the predetermined ones in the sintering step (step (3)) is from 30 to 100 minutes.

18. A sintered article of a polybenzimidazole resin produced by a method set forth in claim 1.

19. A method according to claim 1 wherein the polybenzimidazole resin is brought into contact with substantially no oxygen by conducting at least step (2) and step (3) in an inert gas atmosphere.

20. A method according to claim 19 wherein the inert gas is selected from nitrogen gas, argon gas, and neon gas.

21. A method according to claim 20 wherein the inert gas is argon gas.

22. A method of producing a sintered article of polybenzimidazole comprising, in the following order, the steps of: (1) filling a mold with a polybenzimidazole resin, (2) after closing the mold so that the polybenzimidazole resin can be densely packed in the mold, heating the mold to a predetermined temperature ranging from 500° C. to 600° C. without applying pressure to the mold from the outside, (3) after maintaining the temperature for 0 to 100 minutes, and then increasing the pressure on the mold from 0 kg/cm$^2$ to 50–750 kg/cm$^2$, sintering the polybenzimidazole resin while maintaining the temperature and the pressure for 15 to 200 minutes, (4) cooling the mold to a temperature ranging from 50° C. to 400° C., and (5) removing the sintered article of the polybenzimidazole resin from the mold, wherein the polybenzimidazole resin is brought into contact with substantially no oxygen by conducting at least in step (2) and step (3) in an inert gas atmosphere.

23. A method according to claim 22, wherein the polybenzimidazole resin is brought into contact with substantially no oxygen from the beginning of step (1) to the end of step (5).

24. A method according to claim 22, further comprising, before step (1), the step of preheating the polybenzimidazole resin.

25. A method according to claim 24, wherein the polybenzimidazole resin is preheated to a temperature ranging from 100° C. to 450° C. for 1 to 24 hours.

26. A method according to claim 24, wherein the polybenzimidazole resin is brought into contact with substantially no oxygen from the beginning of the resin-preheating step to the end of step (5).

27. A method according to claim 22, further comprising, before step (1), the step of preheating the mold to a temperature ranging from 100° C. to 450° C.

28. A method according to claim 22, further comprising, between step (1) and step (2), the step of heating the mold and the polybenzimidazole resin contained in the mold at a temperature ranging from 100° C. to 450° C. for 1 to 24 hours.

29. A method according to claim 22, further comprising, before step (2), the step of ramming the polybenzimidazole resin at a pressure of 50–350 kg/cm$^2$ for 30 minutes or less.

30. A method according to claim 22, wherein the length of time in which the temperature and the pressure are maintained at the predetermined ones in the sintering step (step (3)) is from 30 to 100 minutes.

31. A sintered article of a polybenzimidazole resin produced by a method set forth in claim 22.

* * * * *